United States Patent [19]
Meier et al.

[11] 3,982,738
[45] Sept. 28, 1976

[54] DASH-POT ARRANGEMENT FOR BALANCE

[75] Inventors: Eugen Meier, Meilen; Milan Ellner, Uster, both of Switzerland

[73] Assignee: Mettler Instrumente AG, Griefensee-Zurich, Switzerland

[22] Filed: Apr. 14, 1975

[21] Appl. No.: 567,988

[30] Foreign Application Priority Data
Aug. 30, 1974 Switzerland.................. 11831/74

[52] U.S. Cl................ 267/121; 177/157; 177/184
[51] Int. Cl.².............. G01G 23/02; G01G 21/10
[58] Field of Search .......... 267/122, 125, 124, 126, 267/113, 123, 129; 248/358; 188/298, 1 B; 177/126, 184, 188, 157

[56] References Cited
UNITED STATES PATENTS
3,160,007  12/1964  Tate et al............................ 267/122
3,876,017  4/1975  Ziefle................................ 177/184

FOREIGN PATENTS OR APPLICATIONS
659,230  8/1935  Germany........................... 267/121

Primary Examiner—James B. Marbert
Attorney, Agent, or Firm—Hans Berman; Kurt Kelman

[57] ABSTRACT

The dash-pot connected to the balance beam of a portable balance is sealed about the piston rod of the dash-pot by a rubber ring mounted in the cover of the dash-pot and resiliently deformed when an abutment leg projecting from the balance housing is lifted from a supporting surface. The dash-pot arrangement is held thereafter automatically in the locked position, thereby also immobilizing the balance beam, by a spring-loaded detent until the detent is manually released.

9 Claims, 5 Drawing Figures

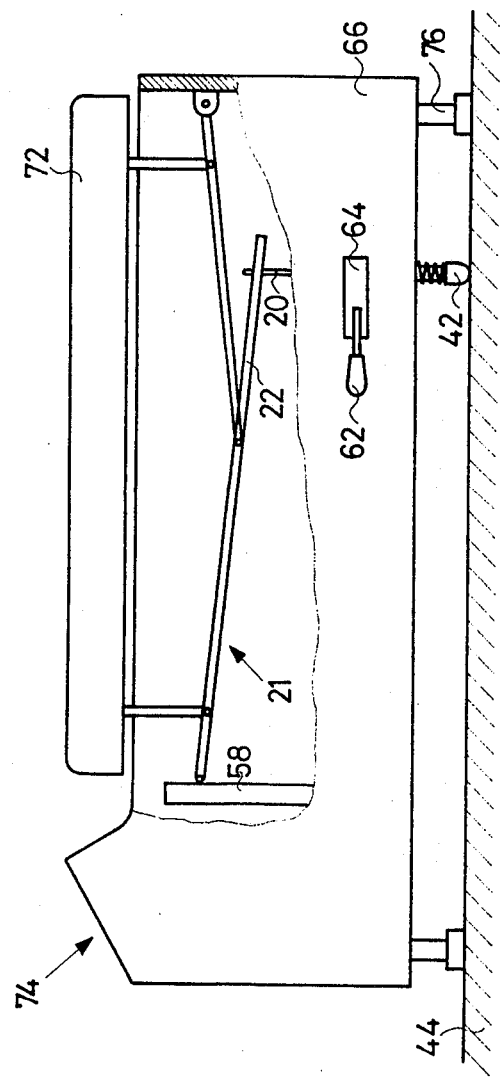

DASH-POT ARRANGEMENT FOR BALANCE

This invention relates to dash-pot arrangements for the beams of balances, and particularly to a dash-pot arrangement suitable for a portable balance in which loss of damping fluid from the dash-pot during transportation is to be avoided.

Dash-pots are employed in balances in preference to magnetic and other dampers when the paths of moving parts are very short and their velocity is small. However, dash-pots effective to impede slow oscillation must employ liquid damping fluids, and provisions must be made in portable balances for preventing spillage of the liquid during transportation. Such provisions are of advantage also in balances which are normally stationary, but may have to be moved at infrequent intervals.

Various devices were proposed heretofore for sealing the vessel of such a dash-pot arrangement during transportation (Patent No. 3,876,017), but they require the active intervention of an operator, and may require more time and effort than is warranted by the problem to be solved.

It is a primary object of this invention to prevent spillage of damping liquid in a dash-pot arrangement of a balance in a simple, and preferably automatic manner.

With this object and others in view, the dash-pot arrangement of the invention for a balance beam provides a vessel enclosing a cavity and formed with an access opening to the cavity which holds a body of damping liquid. A rod member is received in the opening with sufficient clearance to permit free movement of the rod member in a direction inward and outward of the cavity. A piston mounted on the rod member divides the cavity into two compartments and bounds a restricted throttling passage connecting the compartments. A sealing member of resilient material is mounted on the vessel adjacent the opening and the rod member and permits the movement of the rod member when in the relaxed condition. An operating element may be moved toward and away from a position of engagement with the sealing member. When in the last-mentioned position, it resiliently deforms the sealing member sufficiently so that the sealing member seals the opening in the vessel against flow of damping liquid from the vessel cavity. The rod member is provided with means for securing the rod member to the balance beam.

Other features, additional objects, and many of the attendant advantages of this invention will readily be appreciated as the same becomes better understood from the following detailed description of a preferred embodiment when considered in connection with the appended drawing in which:

FIG. 5 is a side-elevational view of a balance equipped with the device shown in FIGS. 1 – 4, the balance housing being partly broken away to reveal internal structure.

Figure 1:
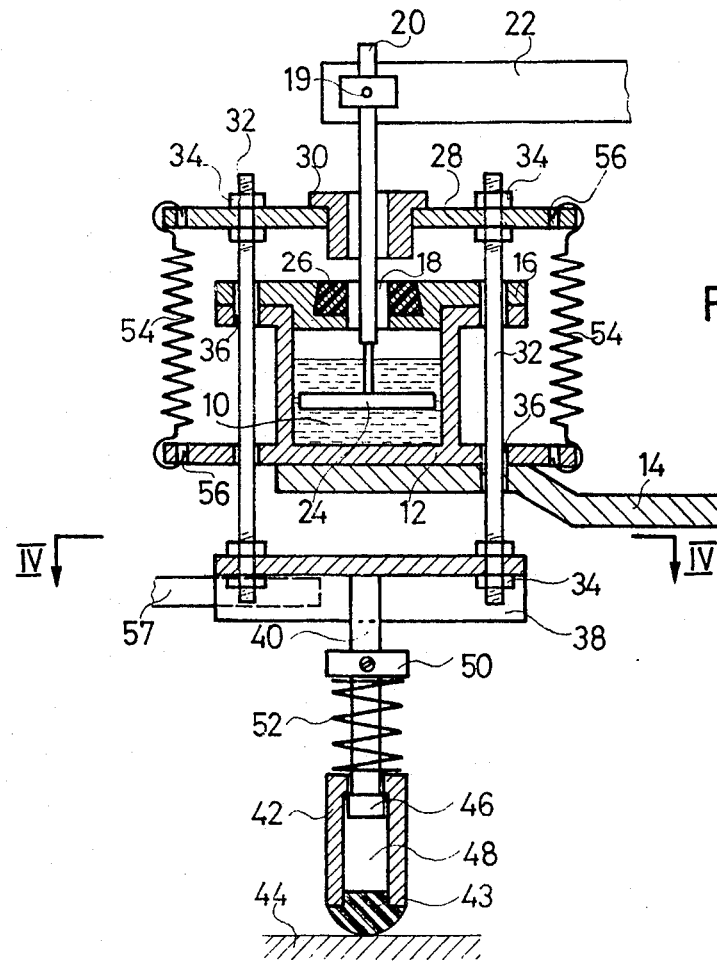
FIG. 1 shows a dash-pot arrangement of the invention and elements of an associated balance in front elevational section.

Referring now to the drawing in detail, and initially to FIG. 5, there is shown a top-loading balance of a basically conventional type whose housing 66 has feet 76 and stands on a table 44. A pan 72 arranged above the top of the housing 66 is secured to the housing by a linkage 21 including a balance beam 22 and hingedly mounted on a frame 58, the frame 58 and the housing 66 constituting the supporting structure of the balance. The pan 72 moves vertically only a few millimeters when a load corresponding to the full capacity of the balance is placed thereon, and the angular movement of the beam 22 is correspondingly small. A counterweight, not explicitly shown, balances the weight of an object placed on the pan 72 in an angular position of the beam 22 which is indicated on a scale in units of weight. The scale, not itself shown, is located adjacent the pan 72 and viewed in the direction of the arrow 74. The structure described so far is conventional.

Movement of the beam 22 is impeded by a rod 20 of a dash-pot mechanism with which is more particularly concerned and which is largely concealed by the housing 66 in FIG. 5. A leg 42 of the mechanism projects downward from the housing 66 and abuttingly engages the table 44. A handle 62 projects from a horizontal slot 64 in the housing 66.

As is better seen in FIG. 1, the rod 20 is hingedly secured to the beam 22 by a pin 19 and depends from the beam. Its lower end carries a horizontal, circular plate or piston 24 which is immersed in a body 10 of oil or hydraulic shock absorber fluid enclosed in a cylindrical vessel 12 having upper and lower radial flanges. The piston divides the cavity of the vessel 12 into two compartments. The inner diameter of the vessel 12 is slightly greater than the diameter of the piston 24 so that the fluid 10 may flow between the two compartments through the annular throttling gap bounded by the piston and the vessel during angular movement of the beam 22 to dampen oscillation of the beam. The vessel 12 rests on a bracket 14 fixedly attached to the frame 58 in a manner not specifically illustrated.

A cover 16 is attached to the upper flange of the vessel 12 by bolts (not shown) and seals the vessel except for a central access opening 18 in the cover 16. An annular groove in the cover 16 about the opening 18 tapers conically in an upward direction and is occupied by a ring 26 of soft, oil-resistant, synthetic rubber. The rod 20 vertically passes through the opening 18 and the ring 26 with ample clearance in the operative condition of the apparatus shown in FIG. 1.

The rod 20 also passes through a tubular aluminum plug 30 coaxially mounted above the ring 26 on a rigid, horizontal, metal strap 38. Vertical tie rods 32 are attached to the two ends of the strap 28 by nuts 34 and are guided in oversized openings 36 of the cover 16, the flanges of the vessel 12, and the bracket 14. The lower ends of the tie rods 32 are connected by an angle bar 38. A pin 40, coaxial with the rod 20, depends from the bar 38, passes through the bottom of the housing 66, not itself seen in FIG. 1, and carries the afore-mentioned leg 42. An axial bore 48 of the leg 42 is downwardly closed by a rubber plug 43 whose spherically arcuate bottom face engages the table 44.

The restricted upper orifice of the bore 48 retains an enlarged head 46 of the pin 40. A strong helical compression spring 52 is coiled about the pin 40 between the radial top surface of the leg 42 and a collar 50 adjustably fastened to the rod 40. The weight of the balance is partly transmitted to the leg 42 by two helical tension springs 54 whose ends are hooked into openings 56 in the strap 28 and in the lower flange of the vessel 12. However, the springs 54 are too weak to overcome the spring 52. A square rod 57 abuts against the angle bar 38.

Figure 3:
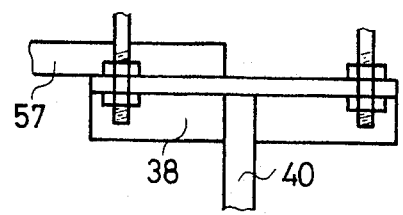
FIG. 3 illustrates another portion of the device of FIG. 1 in a different operating position.
Figure 4:
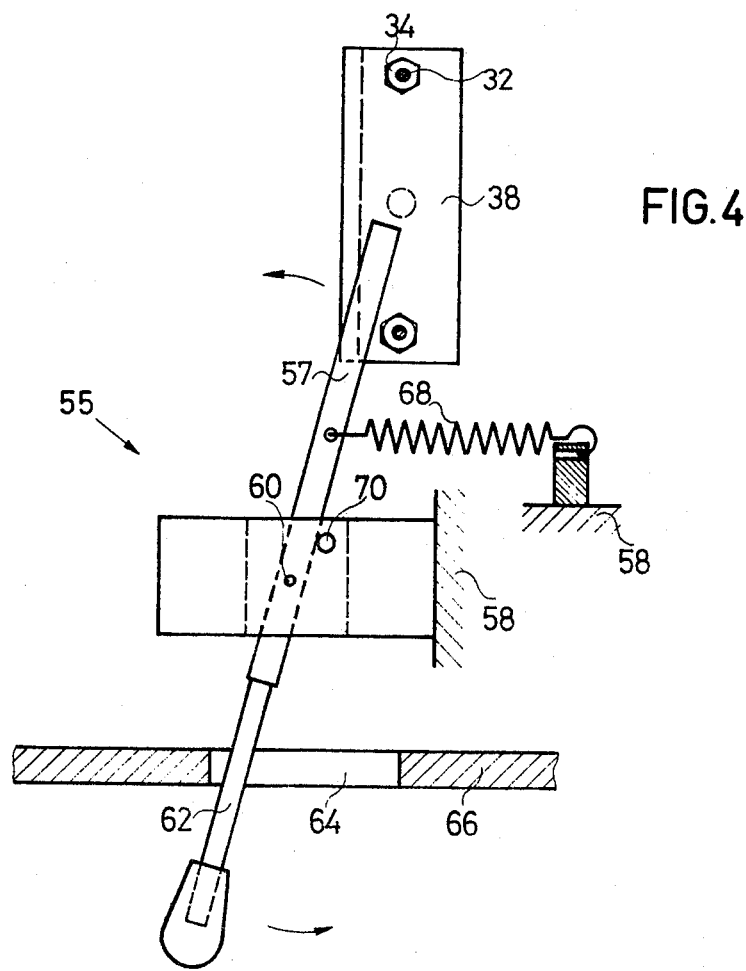
FIG. 4 is a top plan view of the device of FIG. 1 taken on the line IV — IV.

As is better seen in FIG. 4, the rod 57 is mounted on the balance frame 58 by means of a vertical pivot pin 60 and is the detent element of a locking mechanism 55. The aforedescribed handle 62 is attached to the detent rod 57 in longitudinal alignment. A helical tension spring 68 is interposed between the rod 57 and the frame 58 tends to turn the rod 57 clockwise, as viewed in FIG. 4, until the rod abuts against the angle bar 38 in the operative condition of the apparatus shown in FIG. 1, or against a stop 70 on the balance frame as shown in FIGS. 3 and 4, when the bar 38 is dropped below the rod 57.

The dash-pot mechanism automatically seals the oil in the vessel 12 and holds the vessel sealed when the balance is lifted from the table 44 so that the leg 42 can move freely outward of the housing 66 from the position shown in FIGS. 1 and 5.

Figure 2:
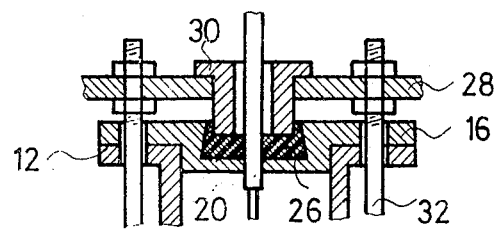
FIG. 2 shows a portion of the device of FIG. 1 in a different operating position.

The springs 54, when not restrained by abutting engagement of the leg 42 with the table 44, pull the strap 28 toward the cover 16. The radial bottom face of the plug 30 is smaller in diameter than the top face of the rubber ring 26 so that the ring is compressed by the plug 30 under the force of the springs 54 and resiliently deformed until it engages the rod 20 about its entire circumference, thereby sealing the vessel 12 against flow of damping fluid from its cavity, but also arresting the beam 22. The sealing engagement of the plug 30 with the ring 26 is best seen in FIG. 2.

During the downward movement of the strap 28, the angle bar 38 also descends from the position seen in FIG. 1 until the rod 57 clears the bar 38 and is drawn into its locking position above the bar 38 by the spring 68, as is shown in FIGS. 3 and 4. Accidental abutting engagement of the leg 42 with a fixed object cannot return the strap 28 to the position shown in FIG. 1. When the balance is set down on another table 44, the spring 52 is compressed by the weight of the balance. When thereafter the handle 62 is swung briefly in the counterclockwise direction indicated by arrows in FIG. 4, the apparatus is returned to the operative condition shown in FIG. 1 in which the beam 22 can swing as freely as the viscosity of the damping fluid 10 permits.

It is necessary for proper operation of the dash-pot mechanism that the plug 30 be of more rigid material than the ring 26, but the specific materials may be chosen freely to satisfy this condition. Thus, the elastomer of the ring 26 may be of any chemical composition resistant to the chosen damping fluid 10, and an even wider choice of materials is available for the plug 30, including synthetic resin compositions.

Similarly, the wire springs 54 may be replaced by other resilient elements for biasing the plug 30 toward engagement with the ring 26 with a force sufficient to overcome the resilient resistance of the latter, yet capable of being overcome by movement of the leg 42, when abuttingly engaged by the table 44. The spring 52 in the motion-transmitting linkage between the leg 42 and the plug 30 may similarly be replaced by a body of air in the leg compressed by the head 46 in the manner of a plunger.

The throttling passage in the preferred embodiment of the invention is bounded by the inner wall of the vessel 12 and the edge of the piston 24. However, this invention does not reside in the specific device which converts the kinetic energy of the flowing liquid 10 into thermal energy by internal friction, and the throttling passage may be provided in the piston 24 only, or in any other manner without significantly modifying the operation of this invention.

It should be understood, therefore, that the foregoing disclosure relates only to a preferred embodiment of the invention, and that it is intended to cover all changes and modifications of the example of the invention herein chosen for the purpose of the disclosure which do not constitute departures from the spirit and scope of the invention set forth in the appended claims.

What is claimed is:

1. A dash-pot arrangement for a balance beam comprising:
   a. a vessel enclosing a cavity and formed with an access opening to said cavity;
   b. a body of liquid in said cavity;
   c. a rod member received in said opening with sufficient clearance to permit free movement of the rod member in a direction inward and outward of said cavity;
   d. a piston mounted on said rod member in said cavity, said piston dividing said cavity into two compartments and bounding a restricted throttling passage connecting said compartments;
   e. an annular sealing member of resilient material mounted on said vessel adjacent said opening;
   f. an annular engagement member of a material more rigid than said resilient material,
      1. said rod member passing freely through said annular members in the relaxed condition of the member;
   g. operating means for moving said engagement member toward and away from a position of engagement with said sealing member,
      1. said engagement member when in said position of engagement resiliently deforming said sealing member sufficiently so that said sealing member seals said opening against flow of said liquid from said cavity; and
   h. securing means for securing said rod member to said balance beam.

2. An arrangement as set forth in claim 1, wherein said operating means include yieldably resilient means biasing said engagement member toward engagement with said sealing member with a force sufficient to overcome the resilient resistance of said sealing member, and abutment means movably secured to said vessel for overcoming said force, and linking means linking said abutment means to said engagement member for moving said engagement member away from said sealing member during movement of said abutment means relative to said vessel.

3. An arrangement as set forth in claim 2, wherein said linking means include spring means biasing said engagement member away from said sealing member with a force greater than said force of said yieldably resilient means.

4. An arrangement as set forth in claim 3, wherein said abutment means include an abutment member mounted on said vessel for movement in said direction and extending away from said vessel.

5. An arrangement as set forth in claim 1, further comprising detent means for locking said engagement member in said position.

6. An arrangement as set forth in claim 5, further comprising manually operable releasing means for releasing said engagement member from said detent means.

7. An arrangement as set forth in claim 1, wherein said sealing member when sufficiently deformed by said engagement member engages said rod member and prevents said movement of the same.

8. An arrangement as set forth in claim 1, further comprising detent means responsive to movement of said engagement member into said position for locking said engagement member in said position, and manually operable releasing means for releasing said engagement member from said detent means.

9. A dash-pot arrangement comprising:
 a. a support;
 b. a balance beam pivotally mounted on said support;
 c. a vessel enclosing a cavity and formed with an access opening to said cavity, said vessel being mounted on said support;
 d. a body of liquid in said cavity;
 e. a rod member secured to said balance beam and received in said opening with sufficient clearance to permit free movement of the rod member in a direction inward and outward of said cavity during pivoting movement of said balance beam on said suppot;
 f. a piston mounted on said rod member in said cavity, said piston dividing said cavity into two compartments and bounding a restricted throttling passage connecting said compartments;
 g. a sealing member of resilient material mounted on said vessel adjacent said opening and said rod member, said sealing member when in the relaxed condition permitting said movement of the rod member;
 h. an engagement member movable toward and away from a position of engagement with said sealing member, said engagement member when in said position resiliently deforming said sealing member sufficiently so that said sealing member seals said opening against flow of said liquid from said cavity; and
 i. operating means for moving said engagement member toward and away from said position thereof including
  1. an abutment member movably mounted on said support and projecting from said support in a downward direction in a position of said arrangement in which said opening is directed upward,
  2. yieldably resilient means biasing said abutment member in said downward direction, and
  3. linking means linking said engagement member to said abutment member for moving the engagement member toward said position of engagement when said abutment member moves against the biasing force of said yieldably resilient means.

* * * * *